United States Patent [19]

Fries

[11] Patent Number: 4,718,946

[45] Date of Patent: Jan. 12, 1988

[54] SELECTIVE REMOVAL OF SULFONIC RESIN EXTRACTABLES WITH ACRYLIC ANION EXCHANGE RESINS

[75] Inventor: William Fries, Southampton, Pa.

[73] Assignee: Rohm and Haas Co., Philadelphia, Pa.

[21] Appl. No.: 601,145

[22] Filed: Apr. 16, 1984

Related U.S. Application Data

[63] Continuation of Ser. No. 414,173, Sep. 2, 1982, abandoned.

[51] Int. Cl.$^4$ .................................................. C13J 1/06
[52] U.S. Cl. .................................. 127/46.2; 210/685; 426/271
[58] Field of Search .............. 127/46.2; 210/685, 670, 210/674; 426/271

[56] References Cited

U.S. PATENT DOCUMENTS

| | | | |
|---|---|---|---|
| 2,372,233 | 3/1945 | Thurston | 127/46.2 |
| 2,911,329 | 11/1959 | Blann | 127/46.2 |
| 4,040,861 | 8/1977 | Walon | 127/46.2 |
| 4,082,564 | 4/1978 | Fries et al. | 127/46.2 |
| 4,187,120 | 2/1980 | Kunin et al. | 127/46.2 |
| 4,329,183 | 5/1982 | Rousseau et al. | 127/46.2 |
| 4,331,483 | 5/1982 | Mirabel et al. | 127/46.2 |
| 4,366,060 | 12/1982 | Leiser et al. | 127/46.2 |

*Primary Examiner*—Richard V. Fisher
*Assistant Examiner*—W. Gary Jones
*Attorney, Agent, or Firm*—John E. Taylor, III

[57] ABSTRACT

Acrylic anion exchange resin is used, either alone or in combination with another anion exchange resin, to purify sugar solutions of the material extracted by the solutions from sulfonated cation exchange resins. The anion exchange resin being derived by polymerization from a monomer mixture comprising polyvinyl crosslinking monomer and one or more monovinyl acrylic monomers.

9 Claims, No Drawings

SELECTIVE REMOVAL OF SULFONIC RESIN EXTRACTABLES WITH ACRYLIC ANION EXCHANGE RESINS

This is a continuation of application Ser. No. 414,173, filed Sept. 2, 1982, now abandoned.

This invention relates to the purification of sugar syrups with ion exchange resins, and more particularly to the removal, by means of acrylic, anion exchange resins, of impurities introduced into the sugar syrup during its treatment with strongly acidic, cation exchange resins.

BACKGROUND OF THE INVENTION

Corn sugar syrups, made by acid hydrolysis of corn starch, are conventionally purified by treating them with strongly acidic, cation exchange resins containing sulfonic acid functional groups, followed by treatment with weakly basic resins made from styrenic, phenolic or epichlorohydrin-polyamine copolymers. These same cation exchange resins are used in the chromatographic and concentration of fructose in the corn sugar syrups. The relatively recent use of corn sugar syrup in the manufacture of carbonated soft-drink beverages has revealed the presence of an impurity in the syrup that reacts with soft-drink ingredients to form an objectionable haze in the beverage product. This haze-forming impurity has been traced to material extracted by the syrup from the sulfonic-group-bearing, cation exchange resins, and is present in syrups treated with such resins made both from styrenic and from phenolic copolymers.

Normal treatment of the corn sugar syrup includes an anion exchange step subsequent to the cation exchange step; this anion exchange step utilizes weakly basic anion exchange resins acceptable to the Food and Drug Administration for food applications. Such resins have been made from styrenic, phenolic and epichlorohydrin-polyamine copolymers. These resins remove a portion of the haze-forming impurity, called hereinafter "sulfonic resin extractables", but enough remains after typical treatment of the corn sugar syrup to produce a detectable, and therefore unacceptable, haze in the soft-drink product. The estimated level of sulfonic resin extractables forming this haze is about 0.1 to about 1 ppm of the sugar syrup. Attempts to remove this level of the impurity with activated charcoal have not been entirely successful.

During the preparation of "high-fructose" corn syrup (HFCS), the corn syrup product stream is separated chromatographically, using the sulfonic-groupbearing, cation exchange resins, into a concentrated fructose solution and a glucose solution. Commercial HFCS is produced by blending the concentrated fructose solution back into the corn syrup product stream to enrich the fructose level. As the individual, concentrated solutions and the enriched product stream have all been exposed to additional sulfonic-groupbearing, cation exchange resin, each will contain sulfonic resin extractables. This is especially significant where the chromatographic separation is not followed by other ion exchange treatments which are partially effective in removing the extractables.

THE INVENTION

I have discovered that an anion exchange resin prepared from an acrylic copolymer is surprisingly effective in reducing the concentration of sulfonic resin extractables in corn sugar syrups to an extremely low level, well below that at which these extractables cause haze formation in carbonated soft-drink beverages, and below the detectability limits of currently available analyses. As a preferred aspect of this invention, I have discovered a process in which a minor amount of a weakly basic, acrylic anion exchange resin is incorporated with a major amount of conventional, weakly basic anion exchange resin into a single bed, to achieve reduction of sulfonic resin extractables to below the haze-forming level.

DETAILED DESCRIPTION OF THE INVENTION

In the process of the present invention sulfonic resin extractables are removed from a sugar syrup treated with a sulfonic-group-functionalized, cation exchange resin by the steps of contacting the sugar syrup, subsequent to treatment with the sulfonic-group-functionalized, cation exchange resin, with an acrylic anion exchange resin, alone, or preferably in combination with a weakly basic anion exchange resin selected from the group consisting of styrenic, phenolic and epichlorohydrin-polyamine anion exchange resins, and more preferably as a minor amount in a mixture with a major amount of a weakly basic anion exchange resin selected from the above group, and subsequently separating the sugar syrup from the anion exchange resin or resins.

This process is intended for the treatment of corn sugar syrups, and in particular, 30% to 60% solids, corn sugar syrups, high-fructose corn sugar syrups, fructose solutions and glucose solutions treated with sulfonic-group-functionalized, cation exchange resins, although it may be applied to any sugar syrups treated with sulfonic-group-functionalized, cation exchange resins, and is effective in removing sulfonic resin extractables from other aqueous liquids which have been in contact with sulfonic-group-functionalized, cation exchange resins.

The sulfonic-group-functionalized, cation exchange resins include resins which have been functionalized by treating a copolymer, either styrenic or phenolic, with a sulfonating agent. The sulfonic groups themselves may be in the form of the free acid or of any other exchangeable cation or mixture of cations.

The acrylic anion exchange resins operable in the process of the present invention include both macroporous and gel resins prepared from crosslinked copolymers of acrylic and methacrylic acid and lower alkyl esters of these acids; lower alkyl esters include esters of methanol ethanol, propanols, butanols, pentanols, hexanols, heptanols and octanols. These copolymers are conventionally functionalized with weakly basic or strongly basic anion exchange functional groups, as for example, primary, secondary, tertiary and quaternary amine groups.

While the process of the present invention more frequently utilizes beds of ion exchange resins, it is possible to mix the resins directly with the sugar syrup and subsequently separate them, as by filtration. As a bed of weakly basic, styrenic, phenolic or epichlorohydrin-polyamine anion exchange resins frequently follows the sulfonic-group-functionalized cation exchange resin, it is often convenient to add the weakly basic, acrylic anion exchange resin directly to the other weakly basic resin or resins in the same vessel, thus avoiding additional process equipment. If necessary, an additional bed of the acrylic anion exchange resin may, of course, be added to the process line; it is preferably added subsequent to the other anion exchange resins, but in any event must be subsequent to treatment with the sulfonic-group-functionalized, cation exchange resin. In the case of high-fructose corn sugar solutions which have been enriched with fructose solutions chromatographically separated using sulfonic-group-functionalized, cation exchange resins, treatment with the acrylic anion exchange resin must follow the chromatographic separation, and preferably occurs subsequent to blending of the fructose solution with the corn sugar solution. In this case the preferred resin is the strongly basic resin used alone. The acrylic resin bed may be much smaller, typically 10% of the volume of the other anion exchange resins, although this size is indicated primarily by economic considerations, and larger beds are permissible. The size of the bed may readily be selected by one skilled in the art, based on the criteria of the equipment and resin cost, and the desired time between regenerations or replacements of the resin.

Treatment temperature may vary practically over the range at which the sugar solution is liquid, that is, from about 0° C. to about 100° C., and higher if the solution is under elevated pressure. A practical upper limit of temperature is that at which the sugar solution acquires excessive color, or the ion exchange resins degrade thermally at an excessive rate. The preferred temperature range is from about 20° C. to about 100° C., and more preferably from about 35° C. to about 50° C.; the higher temperatures are preferred because the viscosity of the sugar solution, and correspondingly the pressure drop across the ion exchange resin bed at a given flow rate, is lower at higher temperatures.

One skilled in the art would appreciate that the anion exchange resin or resins, once separated from the sugar solution, may be reused until the capacity of the resin or resins is exhausted, or until fouling of the resin or resins creates excessive pressure drop across the resin bed, and that the resin or resins may thereupon be discarded. In a preferred embodiment of the present invention, however, the acrylic anion exchange resin is regenerated subsequent to at least partial exhaustion. Regenerants that are effective in removing sulfonic resin extractables from strongly basic acrylic resins include chloride salt solutions, dilute hydrochloric acid solution and concentrated (37%) hydrochloric acid solution; the concentrated acid is preferred. More preferred than aqueous solutions of dilute hydrochloric acid are aqueous solutions of dilute hydrochloric acid containing a water-miscible alcohol at a level of from 0 to about 30% by weight. Such alcoholic solutions are more effective regenerants than hydrochloric acid solutions containing only water as a solvent. Regenerants that are effective in removing sulfonic resin extractables from weakly basic acrylic resins include alkali metal and ammonium hydroxide and carbonate solutions; the preferred regenerants are dilute (3-20%) aqueous solutions of these hydroxides and carbonates. Treatment of the resin with the above regenerants involves conventional techniques of contacting the resin with the regenerant and subsequently separating them; these will be apparent to those skilled in the art.

As used herein, a major amount shall mean an amount greater than 50% by weight of the total amount. A minor amount, as used herein, shall mean an amount less than 50% by weight of the total amount.

The following examples are intended to illustrate the invention, and not to limit it except as it is limited in the claims. All reagents indicated herein are of good commercial quality, and all percentages and other proportions are by weight, unless otherwise indicated.

EXAMPLE 1

A concentrated filtrate containing about 50 ppm of sulfonic resin extractables was prepared, for ease of analytical determination for the extractables. The sulfonic-group-functionalized resin was ground, extracted with water and filtered through a filter, membrane of 0.1 nm pore size; the resulting clear filtrate was dried at 105° C. and the dry residue was used to add a known concentration of sulfonic resin extractables to the sugar solutions.

For each of a series of adsorbents and ion exchange resins, 30 g of 40% aqueous glucose solution containing 50 ppm of sulfonic resin extractables was placed in contact with 3 g of the adsorbent or ion exchange resin, and the mixture was agitated vigorously for 1.0 hour. The percentage of sulfonic resin extractables adsorbed by the resin or adsorbent was determined from the reduction in ultraviolet absorption of the glucose solution at the absorption maximum which occurs at about 225 nm. Table I identifies the ion exchange resins and adsorbents which were tested, and Table II shows the results of these tests.

TABLE I

| Resin Designation | Copolymer Type | Copolymer Form | Resin Functionality |
|---|---|---|---|
| A | Methyl Acrylate-DVB | Gel | Tert. Amine W.B. |
| B | Methyl Acrylate-DVB | Macroporous | Quat. Amine S.B. |
| C | Methyl Acrylate-DVB | Gel | Quat. Amine S.B. |
| D | (Thermally activated carbon adsorbent.) | | |
| E | Styrene-DVB | Macroporous-large pores | Quat. Amine S.B. |
| F | TETA - Epichlorohydrin | Gel | W.B. Amine |
| G | Styrene-DVB | Macroporous | Sulfonated S.A. |
| H | Styrene-DVB | Macroporous | Quat. Amine S.B. |
| I | Styrene-DVB | Highly Macroporous-large pores | Unfunctionalized |
| J | Phenol-Formaldehyde | Macroporous | Tert. Amine W.B. |
| K | Styrene-DVB | Macroporous | Tert. Amine W.B. |
| L | Styrene-DVB | Highly Macroporous | Unfunctionalized |
| M | Styrene-DVB | Highly Macroporous-large pores | Unfunctionalized |
| N | Methyl Acrylate-DVB | Highly Macroporous | Unfunctionalized |
| O | Styrene-DVB | Gel | Quat. Amine S.B. |
| P | Styrene-DVB | Gel | Sulfonated S.A. |
| Q | Methyl Acrylate-DVB | Macroporous | Tert. Amine W.B. |

S.A. = Strongly Acidic
S.B. = Strongly Basic
W.B. = Weakly Basic
DVB = Divinylbenzene

TABLE II

| Resin Designation | Pre-Treatment[1] | Functional Group Form | Extractables Remaining After Treatment, ppm |
|---|---|---|---|
| A | None | Free Base | 0.5 |
| A | $H_2SO_4$ | $SO_4^=$ | 0 |
| B | None | $Cl^-$ | 0 |
| B | $H_2SO_4$ | $SO_4^=$ | 0 |
| C | None | $Cl^-$ | 0.5 |
| D | None | — | 4 |
| E | None | $Cl^-$ | 3.5 |
| F | $Na_2CO_3$ | Free Base | 17 |
| F | NaOH | Free Base | 21 |
| G + H[2] | Regeneration | $H^+, OH^-$ | 18.5 |
| I | Alcohol | — | 21 |
| J | $Na_2CO_3$ | Free Base | 26 |
| K | $Na_2CO_3$ | Free Base | 28.5 |
| L | Alcohol | — | 31.5 |
| M | Alcohol | — | 38 |
| N | Alcohol | — | 50 |
| O + P[2] | Regeneration | $H^+, OH^-$ | 50 |
| Q | None | Free Base | 0 |

[1]Soak with aqueous solution of indicated reagent, or with alcohol.
[2]Mixed bed, i.e., a mixture of the two resins.

EXAMPLE 2

This example illustrates the use of an acrylic, weak-base anion exchange resin under continuous-flow conditions for sugar syrup treatment. A 2-inch-long by 0.5-inch-diameter bed of Resin A was used to treat a decationized, 30% dextrose solution containing 50 ppm of sulfonic resin extractables. The dextrose solution, at 50° C. was passed through the bed at a flow rate of 10 bed volumes per hour until the conductivity of the effluent solution began to increase sharply at about 20 μmho/cm. the dextrose solution flow was stopped, and the number of bed volumes of solution treated was recorded. The bed was then regenerated with a 7%, aqueous sodium carbonate solution. The capacity of the resin bed for total anionic substances was determined from the known anion concentration of the solution and the volume of solution treated. The maximum resistivity of the treated solution for each cycle was recorded. The sulfonic resin extractables' leakage was measured spectrophotometrically, at the absorption maximum at about 225 nm, at the end of each cycle. The results are shown in Table III below.

The high flow rate and small bed volume used in the above example simulate the conditions under which the resin would operate as a minor amount of resin mixed into a conventional working anion exchange resin bed.

TABLE III

| Cycle No. | Bed Volumes During Cycle | Resin Capacity After Cycle (meq/ml) | Maximum Resistivity (Megohm-cm) | Extractables Leakage (ppm) |
|---|---|---|---|---|
| 1 | 60 | 1.63 | 0.30 | 0 |
| 2 | 57 | 1.56 | 0.35 | 0 |
| 3 | 53 | 1.43 | 1.20 | — |
| 4 | 52 | 1.40 | 1.40 | 2.5 |
| 6 | 53 | 1.43 | 1.80 | 3.5 |

EXAMPLE 3

This example illustrates the use and regeneration of an acrylic, strong-base anion exchange resin under conditions of continuous flow for sugar syrup treatment. A 2-inch-long by 0.5-inch-diameter bed of Resin B was used to treat a dextrose solution simulating deionized, 40% dextrose from conventional sugar syrup processes. The syrup was passed through the bed at a rate of 5 bed volumes per hour. The syrup contained 50 ppm of the sulfonic resin extractables described above, and leakage of the extractables through the bed was less than the limit of detectability for 900 bed volumes. Resin exhausted with sulfonic resin extractables was regenerated satisfactorily with aqueous concentrated hydrochloric acid.

I claim:

1. A process for removing sulfonic resin extractables from an aqueous sugar solution treated with sulfonated ion exchange resin which comprises the steps of contacting the sugar solution, at a temperature from about 0° C. to about 100° C., subsequent to treatment with sulfonated cation exchange resin, with an acrylic, anion exchange resin, the anion exchange resin being derived by polymerization from a monomer mixture comprising polyvinyl crosslinking monomer and one or more monovinyl acrylic monomers selected from the group consisting of acrylic acid, methacrylic acid, $C_1$–$C_8$ alkyl esters of acrylic acid and $C_1$–$C_8$ alkyl esters of methacrylic acid, until the sulfonic resin extractables are reduced to a level below 1 part per million parts of solution, and subsequently separating the sugar solution from the anion exchange resin.

2. The process of claim 1 wherein the acrylic anion exchange resin is strongly basic.

3. The process of claim 1 wherein the acrylic anion exchange resin is weakly basic.

4. The process of claim 1 wherein the acrylic anion exchange resin is a macroporous resin.

5. The process of claim 1 wherein the acrylic anion exchange resin is a gel resin.

6. The process of claim 1 wherein the acrylic anion exchange resin is present as a minor amount in a mixture with a major amount of a weakly basic anion exchange resin selected from the group consisting of styrenic, phenolic and epichlorohydrin-polyamine resins.

7. The process of claim 1 wherein, subsequent to at least partial exhaustion of the acrylic anion exchange resin, the additional steps are performed of contacting the acrylic anion exchange resin with a regenerant solution, and subsequently separating the regenerant solution from the acrylic anion exchange resin.

8. The process of claim 7 wherein the acrylic anion exchange resin is weakly basic and the regenerant solution is an aqueous solution selected from the group consisting of alkali metal hydroxides, ammonium hydroxide and alkali metal carbonates.

9. The process of claim 7 wherein the acrylic anion exchange resin is strongly basic and the regenerant solution is selected from the group consisting of aqueous alkali metal chloride, concentrated hydrochloric acid, and dilute aqueous hydrochloric acid containing a water-miscible alcohol at a level of from 0 to about 30% by weight.

* * * * *